United States Patent [19]
Cartwright

[11] 4,133,188
[45] Jan. 9, 1979

[54] BACK-UP TORQUE TRANSMITTING STRUCTURE

[75] Inventor: John N. Cartwright, Indianapolis, Ind.

[73] Assignee: General Motors Corporation, Detroit, Mich.

[21] Appl. No.: 815,107

[22] Filed: Jul. 13, 1977

[51] Int. Cl.² ............................ F16D 3/79; F16B 7/18
[52] U.S. Cl. ........................................ 64/13; 64/15 R; 64/1 C
[58] Field of Search ................ 64/13, 15 R, 15 B, 1 C

[56] References Cited

U.S. PATENT DOCUMENTS

| | | | |
|---|---|---|---|
| 2,016,154 | 10/1935 | McWhirter | 64/27 NM |
| 2,877,633 | 3/1959 | Hagenlocher | 64/13 |
| 3,041,857 | 7/1962 | Anderson | 64/13 |
| 3,080,732 | 3/1963 | Crankshaw | 64/13 |
| 3,124,942 | 3/1964 | Rothfuss | 64/13 |
| 3,320,771 | 5/1967 | Roethlisberger | 64/27 NM |
| 3,427,826 | 2/1969 | Anderson | 64/13 |
| 3,500,660 | 3/1970 | Anderson | 64/13 |
| 3,808,837 | 5/1974 | Anderson | 64/15 R |
| 4,044,571 | 8/1977 | Wildhaber | 64/13 |
| 4,055,966 | 11/1977 | Fredricks | 64/13 |

FOREIGN PATENT DOCUMENTS 898807  5/1945  France ........................ 64/1 C

Primary Examiner—Allan D. Herrmann
Assistant Examiner—R. C. Turner
Attorney, Agent, or Firm—J. C. Evans

[57] ABSTRACT

A gas turbine engine coupling assembly includes a radially outwardly located diaphragm coupling having a pair of thin relatively flexible diaphragms mounted between two rotating members to permit torque transfer therebetween and to compensate for angular misalignment and axial position compensation therebetween; and wherein the diaphragm coupling further includes a pair of high backlash, non-contacting spline elements located approximately in the plane of the diaphragms including a male splined part secured to one of the rotating members and a female splined part attached to the other member centered radially by the pair of diaphragms to preclude splined members from contacting one another during normal operation and wherein the splined parts back up the diaphragms by contact to directly couple the two rotating parts together to prevent engine overspeed in the event of diaphragm failure.

2 Claims, 4 Drawing Figures

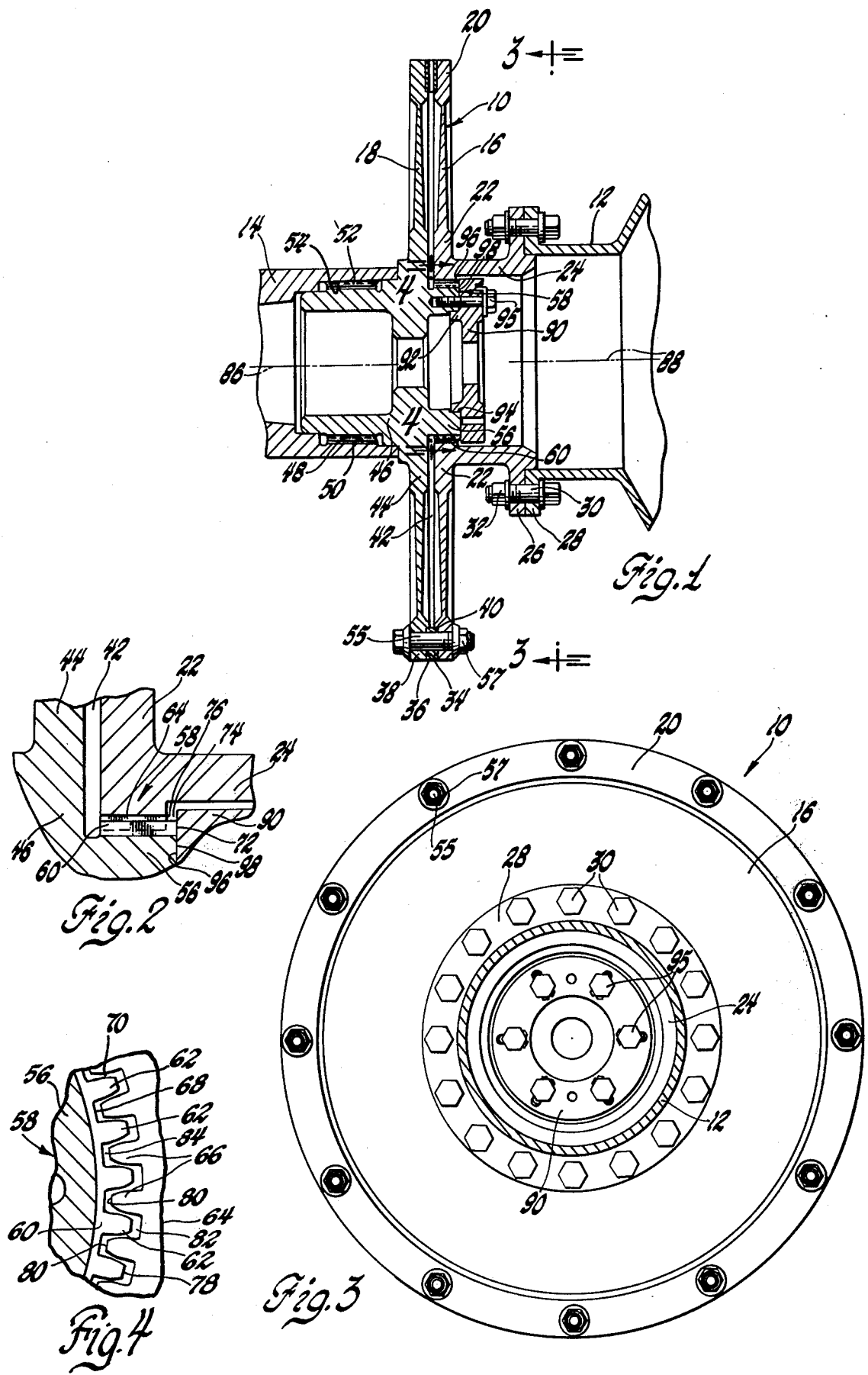

BACK-UP TORQUE TRANSMITTING STRUCTURE

The invention herein described was made in the course of work under a contract or subcontract thereunder with the Department of Defense.

This invention relates to diaphragm type couplings and more particularly to diaphragm type couplings having back-up connector components therein operative to maintain torque transfer between first and second rotating members.

Diaphragm type couplings are devices consisting of one or more thin relatively flexible diaphragm elements mounted between two rotating members to permit simultaneous torque transfer, angular misalignment and axial position compensation between the coupled rotating members, which typically constitute shaft members in a drive system.

Examples of such diaphragm type couplings are set forth in U.S. Pat. No. 3,611,750, issued Oct. 12, 1971, to Gasior and U.S. Pat. No. 3,677,031, issued July 18, 1972, to Zierak et al.

In such arrangements, flexibility of the diaphragm components therein produce a desired accommodation of angular misalignment and axial position compensation between the two rotating shaft members without a moving surface contact between the parts.

Moreover, such diaphragm type couplings can be supplied to include mechanical stops therein to prevent diaphragm overstress under conditions where excessive axial extension or compression of the coupling occur. Additionally, such couplings may include a pilot to maintain shaft centering in the event of diaphragm failure.

The present invention is directed to an improvement of such couplings for use in gas turbine engines where it is desirable to have a redundant or back-up provision for torque transmittal to prevent loss of load or a drive unit overspeed in the event of diaphragm failure.

Accordingly, an object of the present invention is to provide an improved diaphragm type coupling having one or more thin relatively flexible diaphragms connected between two rotating shaft members and wherein the coupling further includes a non-contacting splined coupling located radially inwardly of and in the plane of the diaphragms and wherein the splined coupling includes a male splined part secured to one rotating shaft member and a female splined part attached to the other member, the male and female splined parts being radially centered by the one or more diaphragms to prevent contact between the splined parts during normal coupling operation and wherein the splined parts will contact when the diaphragm components no longer center the spline members so as to cause continual torque transmittal from an engine to a driven load so as to prevent overspeed of the drive unit and wherein the splined parts also serve as a radial pilot for the shaft when in their contact position.

Further objects and advantages of the present invention will be apparent from the following description, reference being had to the accompanying drawings wherein a preferred embodiment of the present invention is clearly shown.

FIG. 1 is a view in vertical section of a diaphragm coupling including the present invention;

FIG. 2 is an enlarged fragmentary sectional view of male and female splined parts of a non-contacting redundant coupling in the present invention;

FIG. 3 is a vertical sectional view taken along the line 3—3 of FIG. 1 looking in the direction of the arrows;

FIG. 4 is an enlarged, fragmentary sectional view taken along the line 4—4 of FIG. 1 looking in the direction of the arrows.

Referring now to the drawings, in FIG. 1 a coupling assembly 10 is illustrated for connecting a first shaft 12 adapted to be connected to a gas turbine engine and a second shaft 14 which is adapted to be connected to a suitable load. The coupling 10, in accordance with the present invention, includes a pair of thin sectioned relatively flexible annular discs or diaphragms 16, 18 that permit simultaneous torque transfer between the shafts 12 and 14 while accommodating angular misalignment and axial position variation to exist therebetween.

More particularly, in the illustrated arrangement the diaphragm member 16 includes a continuously formed thickened ring 20 at its outer periphery and is connected at its root to a radially outwardly directed continuously circumferentially formed flange 22 of an axial hub 24 with an end flange 26 thereon joined to a flange 28 on the shaft 12 by a plurality of connector bolts 30 directed therethrough and secured to the flanges by means of fastener nuts 32.

The thickened ring 20 has an inboard undercut shoulder 34 thereon which is faced toward an inboard undercut shoulder 36 on a radially outwardly thickened ring 38 on the diaphragm 18. The undercut shoulders 34, 36 supportingly receive a spacer ring 40 to maintain a controlled radial pilot between thickened rings 20 and 38 and to maintain a controlled annular gap 42 between the flange 22 on the diaphragm 16 and a like flange 44 on the diaphragm 18. The flange 44 is formed integrally on the outer circumference of an axial hub 46 including a plurality of spline teeth 48 thereon that are in engagement with a plurality of circumferentially spaced grooves 50 formed between spline teeth 52 that are seated within grooves 54 on the hub 46 to directly connect the shaft 14 to the diaphragm 18.

The diaphragms 16, 18 are connected at the thickened rings 20 and 38 thereon be a plurality of connector bolts 55 directed through aligned bores in the rings and by fastener nuts 57 to securely clamp the diaphragms 16, 18 together at their outer periphery.

The radially inner axial hub 46 of the diaphragm 18 further includes an inboard directed hub segment 56 of a redundant mechanical coupling 58 having a male splined part 60 on the outer periphery of the hub 56 including a plurality of radially outwardly directed circumferentially spaced spline teeth 62 thereon constituting an external spline configuration that is normally maintained out of contact with an internal, involute female splined part 64 on the flange 22. Part 64 has a plurality of radially inwardly directed spline teeth 66 located in circumferentially spaced relationship to the teeth 62 within grooves 68 therebetween. Likewise, the teeth 62 are spaced with respect to the internal female splined part 64 at grooves 70 formed between each of the teeth 66.

As seen in FIG. 2, each of the tooth spaces of the external male splined part 60 has a closed end 72 which is spaced by a gap 74 from the end 76 of the teeth 66 on the internal involute, female splined part 64. The gap 42 and the gap 74, together, accommodate axial movement between the non-contacting teeth 62, 66 of the male splined part 60 and the female splined part 64 to provide for axial position compensation between the shafts 12, 14.

Moreover, the crown 78, 80 of each of the teeth 62, 66, respectively, are spaced by a gap 82, 84, respectively, with respect to the bottom of a mating space.

The high backlash at the spline pitch diameter of the illustrated non-contacting spline accommodates angular misalignment between the longitudinal axis 86 of the shaft 14 and the longitudinal axis 88 of shaft 12.

The coupling 10 further includes an axial travel limit plate 90 that includes a radially inwardly located flange 92 fit within an undercut shoulder 94 at the end of the hub 56. The limit ring 90 is secured to the hub 56 by a plurality of fastener screws 95. It includes a stop surface 96 thereon that locates against the end surface 98 of the male splined part 60 as shown in FIG. 2 and, additionally, makes contact with the ends 76 of female spline teeth 66 following maximum axial extending displacement between the shafts 12, 14. Maximum axial compressing displacement between shafts 12 and 14 is limited by the opposite ends of the female spline teeth 66 contacting hub 46.

In drive systems of the type illustrated, and especially in the case of gas turbines, when the load connected to the shaft 14 is removed the gas turbine shaft 12 can overspeed.

Normally, the flexible diaphragms 16, 18 serve to transmit torque to prevent this condition from occurring. During this phase of operation the male splined part 60 is maintained out of contact with the female splined part 64. However, as a redundant method of torque transmittal, the male splined part 60 will contact the female splined part 64 if either of the diaphragms 16, 18 fail to maintain an axis centering of the male and female parts of the back-up spline coupling 58 at its radially inwardly located position, substantially in the plane of the diaphragm 16. Normally, the axis centering feature of a structurally intact diaphragm coupling will preclude the male and female parts of the high backlash spline coupling from contacting since these parts are manufactured with excessive spline arc tooth clearances as set forth in the following listed data characteristics of the spline parts of the coupling 58.

| TORSION FAILURE BACK-UP | SPLINED PARTS 60 and 64 |
| --- | --- |
| Number of Teeth | 45 |
| Pitch | 16/32 |
| Pressure Angle | 30° |
| Pitch Dia. | 2.8125 |
| Circular Tooth Thicknesses | (External) |
| Max. Effective | .0937 |
| Min. Effective | .0909 Ref. |
| Max. Actual | .0900 Ref. |
| Min. Actual | .0872 |
| Circular Space Width | (Internal) |
| Max. Actual | .1047 |
| Min. Actual | .1019 Ref. |
| Max. Effective | .1010 Ref. |
| Min. Effective | .0982 |

If the diaphragms 16, 18 do not perform their centering action, the splined parts 60, 64 will make contact and function so as to permit the coupling 10 to continue to transmit torque and thereby prevent overspeed of a gas turbine drive unit. The redundant torque transmittal feature also functions as an effective radial pilot for the rotating shaft parts 12, 14 in the event of diaphragm failure.

While the embodiments of the present invention, as herein disclosed, constitute a preferred form, it is to be understood that other forms might be adopted.

The embodiments of the invention in which an exclusive property or privilege is claimed are defined as follows:

1. A shaft coupling assembly for connecting a first shaft to a second shaft and to accommodate axial displacement therebetween comprising a first coupling hub having means thereon for connecting said hub to a shaft, a second coupling hub having means thereon for connection to a second shaft, an outer peripheral flange on said first hub having a thin-sectioned member secured thereto and extending radially outwardly thereof, an outer peripheral lug on said second hub having a thin-sectioned member secured thereto and extending radially outwardly thereof, means including a spacer ring connecting the outer peripheries of said thin-sectioned members to maintain an axial space between said first and second hubs to allow for limited angular movement between said first and second hubs to accommodate shaft misalignment, and means including a male splined member and a female splined member for defining a back-up shaft couple, said male splined member and said female splined member being connected, respectively, to said first coupling hub and to said second coupling hub at a point radially inwardly of one of said first and second hubs, said splined members being radially and circumferentially spaced on all sides to prevent contact therebetween in either direction of rotation of said first shaft and said second shaft while permitting limited angular movement for shaft alignment and operative to directly couple the first and second shafts when circumferential spacing between said splined members is closed due to excessive torsional angular movement between the first and second shafts.

2. A shaft coupling assembly for connecting a first shaft to a second shaft and to accommodate axial misalignment therebetween comprising a first coupling hub having means thereon for connecting said hub to a first shaft, a second coupling hub having means thereon for connection to a second shaft, an outer peripheral flange on said first hub having a thin-sectioned disc secured thereto and extending radially outwardly thereof, an outer peripheral flange on said second hub having a thin-sectioned disc secured thereto and extending radially outwardly thereof, means including a spacer ring connecting the outer peripheries of said discs to maintain an axial space between said first and second hubs to allow for limited angular movement between said first and second hubs to accommodate shaft misalignment, an extension on said first hub telescoped interiorly of said second hub, and means including first and second sets of spline teeth on said extension and said second hub, said first and second sets of teeth being both radially and circumferentially spaced to permit the aforesaid limited angular movement for shaft alignment and operative to directly couple the first and second shafts when circumferential spacing between said sets of spline teeth is closed due to excessive torsional angular movement between the first and second shafts.

* * * * *